Dec. 31, 1929.    F. F. LEITER    1,741,575
ENDOSCOPE
Filed April 29, 1925
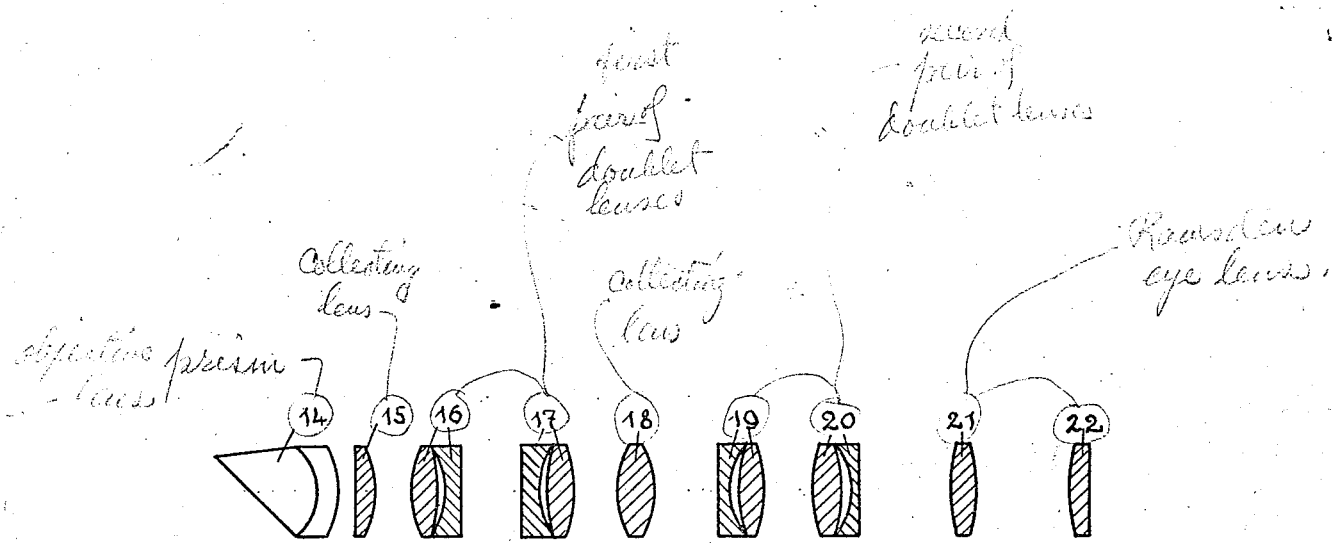
Inventor
Friedrich Ferdinand Leiter
per William H. Young.
Attorney.

Patented Dec. 31, 1929

1,741,575

UNITED STATES PATENT OFFICE

FRIEDRICH FERDINAND LEITER, OF VIENNA, AUSTRIA

ENDOSCOPE

Application filed April 29, 1925, Serial No. 26,646, and in Austria June 12, 1923.

This invention relates to cystoscopes, endoscopes, and instruments of this class. Instruments of this class are known which have sheaths of such diameter that one can insert either a telescope of great calibre and high magnifying power, or a thin optical system, and also comprising an instrument for urethral catheterization and operative work in the vesical interior. These cystoscopes show certain drawbacks because of loss of the blatter-filling when the obturator, or the optical systems, are changed. The automatic valves hitherto used for effecting such changes do not act in a satisfactory manner.

The present invention has for its object to provide an improved endoscope free from the above mentioned disadvantages and will now be described with reference to the accompanying drawing in which, Fig. 1 is a view of a lens system employed in the endoscope of the invention.

In order to make is possible that the endoscope (cystoscope) may be sterilized in boiling water, I have provided a new telescope system illustrated in the drawing. The system comprises a prism 14 which is an entrance reflecting prism of the inverting ridge type and is combined with an objective lens, the whole consisting of one piece. In this system 15 is the collecting lens and 16 and 17 a pair of achromatic double lenses by which the image reproduced by the collecting lens is inverted and a real image again reproduced, 18 is a second collecting lens, 19 and 20 a second pair of achromatic double lenses, 21, and 22 an eye piece of the Ramsden- or Huygens-type.

The main feature of the new telescope system lies in that the lens-systems, including the halves of the double-lenses of the achromatic units by which the image is inverted, consist of two, three or more lenses of different sorts of glass which are not cemented and are arranged at short distances from one another. With this arrangement the rays have the same path and limitation as usual with such instruments.

It has already been proposed to achromatize in a stable manner an optical system for inverting the image, by using lenses which are not cemented and consist of different kinds of glass, but hitherto such systems have not been used in a cystoscope, endoscope, or other instrument which has to be sterilized in boiling water. Of course this invention may be employed not only with the telescope shown in the drawing but also with any other endoscopic telescope since as already mentioned the path and limitation of the rays is not altered in the least.

I claim:

1. In an instrument of the class described, a system of achromatizing lenses for reversing the image comprising a multiplicity of non-cemented lenses of different kinds of glass arranged apart at a distance not greater than the diameter of the lenses.

2. In an instrument of the class described, a system of achromatizing pairs of lenses for reversing the image comprising a multiplicity of non-cemented lenses of different kinds of glass arranged apart at a distance not greater than the diameter of the lenses.

3. In an instrument of the class described, a system of achromatizing lenses for reversing the image comprising a multiplicity of non-cemented lenses of different kinds of glass arranged apart at a distance not greater than the thickness of the lenses.

4. In an instrument of the class described, optical parts adapted to present to the observer an image of the part of the body to be examined, which optical parts comprise lens systems composed of a plurality of lenses, the single members of these systems consisting of different kinds of glass in order to achieve chromatic correction, not being cemented and positioned in spaced relation with respect to each other.

FRIEDRICH FERDINAND LEITER.